Aug. 25, 1931.  W. E. KNOTT  1,820,278

SAW SETTING MACHINE

Filed April 16, 1928  2 Sheets-Sheet 1

Inventor
Warren E. Knott
By Liverance and
Van Antwerp
Attorneys

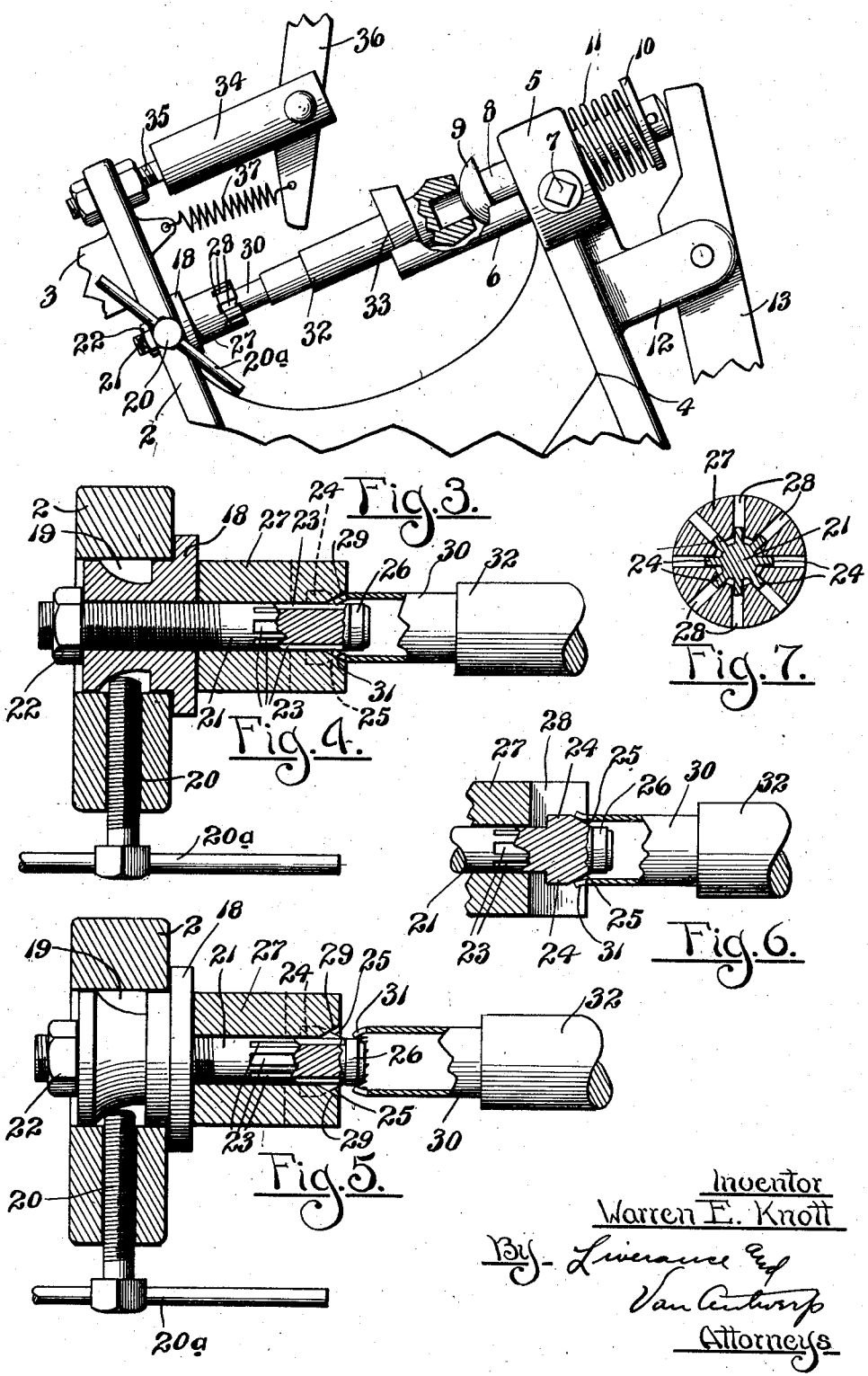

Patented Aug. 25, 1931

1,820,278

UNITED STATES PATENT OFFICE

WARREN E. KNOTT, OF GRAND RAPIDS, MICHIGAN, ASSIGNOR, BY MESNE ASSIGNMENTS, TO PIONEER PEARL BUTTON COMPANY, OF POUGHKEEPSIE, NEW YORK, A CORPORATION OF NEW YORK

SAW SETTING MACHINE

Application filed April 16, 1928. Serial No. 270,201.

This invention relates to a saw setting machine, designed for setting cylindrical saws which are used to saw circular blanks, particularly button blanks, from shell. It is an object and purpose of the present invention to provide a saw setting machine adapted to quickly and easily set saws of this character and in which, by use of different saw setting dies which may be readily placed in or taken from the machine, various different sizes of saws may be readily set. It is a further object and purpose of the invention to provide a machine wherein setting the saw is accomplished and a perfect set obtained, all of the uncertainties of handling by an operator and all discrepancies due to the personal element of the operator being eliminated and the saw setting operation being entirely mechanical so that a uniform and perfect set of the saw is accomplished.

Many other objects and purposes than those stated will be apparent after an understanding of the invention is had from the following description taken in connection with the accompanying drawings, in which, Fig. 1 is a side elevation of the saw setting machine.

Fig. 3 is a fragmentary side elevation similar to that shown in Fig. 1, but with the parts in a different position such as they occupy during the setting operation.

Fig. 4 is a fragmentary enlarged horizontal section through the immediate saw setting elements of the machine, and showing a saw in the operation of being set.

Fig. 5 is a similar section but illustrating the saw as it is being removed from engagement with the saw setting elements.

Fig. 6 is a fragmentary enlarged longitudinal section through said saw setting elements and showing the saw in setting position, and Fig. 7 is an enlarged transverse section through said saw setting elements.

Like reference characters refer to like parts in the different figures of the drawings.

Figure 1:
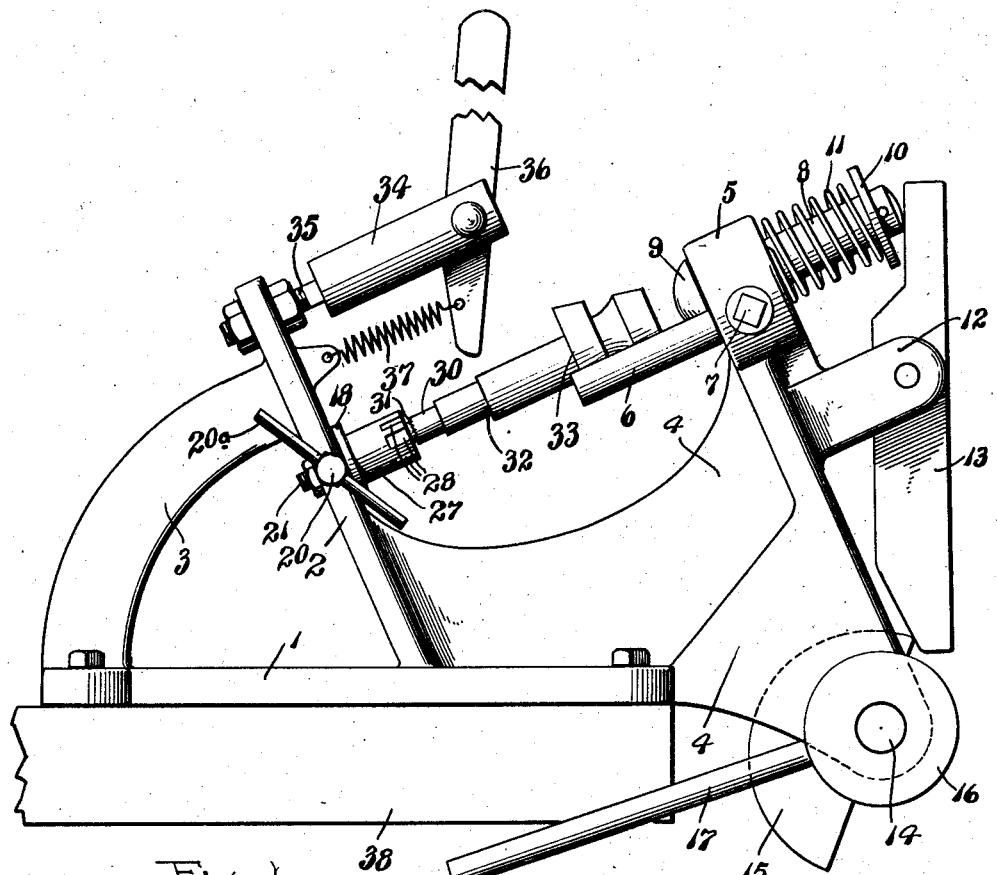
Figure 2:
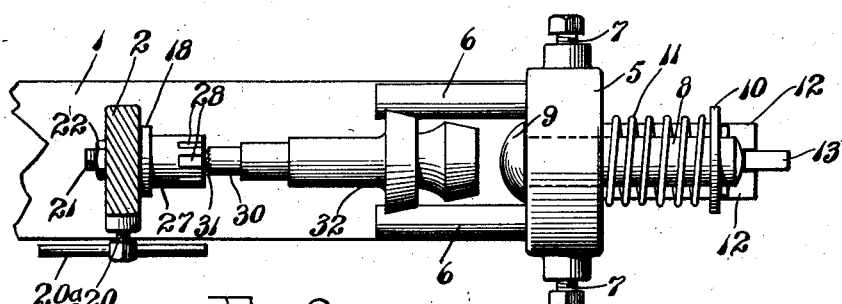
Fig. 2 is a partial plan and section fully illustrating, in plan, the saw setting mechanism.

In the construction of the machine, a supporting base 1 is used from which a post 2 extends upwardly and to the rear at an angle to the horizontal, being braced and supported by a curved brace 3 extending between the post and brace and integral therewith. In front of the post 2 and integrally connected with the base is an extension 4 at the upper front portion of which a journal sleeve 5 is formed on which two cylindrical pins 6 are connected by means of set screws 7. The pins extend downwardly and to the rear toward the post 2 and are located at right angles thereto.

A cylindrical plunger 8 passes freely through the journal 5 and at its rear end is formed with a rounded head 9. Adjacent its front end it carries a washer 10 between which and the front side of the journal 5 a coiled spring 11 is located, the normal tendency of which is to move the plunger in a forward direction, or until the head 9 comes against the rear side of said journal 5.

At the front side of the extension 4 of the support described a pair of ears 12 are integrally cast between which a lever 13 is pivotally mounted between its ends, the upper end bearing against the front end of the plunger 8. A shaft 14 is rotatably mounted at the lower corner of the extension 4 of the support for the mechanism, at one end of which an eccentric cam 15 is fixed adapted to bear against the lower inner edge of the lever 13. The opposite end of the shaft 14 carries a disk 16 from which a handle in the form of a rod 17 extends. It is evident by grasping the handle 17 and turning it upward in a clockwise direction, lever 13 is rocked about its pivot and the plunger 8 moved to the rear with an accompanying compression of the spring 11.

An opening is made through the post 2 in alinement with the axis of the plunger 8, in which a die holder 18 is located. The die holder 18 at its front end has an annular flange larger than the diameter of the opening through the post 2 which bears against the front side of the post, and between its ends it is formed with an annular groove 19. A set screw 20 threads through one side of the post 2, its inner end being received within the groove 19 and bearing against the holder 18. The set screw is operated by a rod 20a passing through the head of the screw. The form of the groove 19 is such that when the inner end of the set screw comes against the holder 18 at the bottom of the groove there is a tendency to draw the holder 18 to the rear and bring the flange thereof snugly against the post 2.

An axial opening is made through the holder 18 which is interiorly threaded and a threaded rod 21 is screwed through the holder 18 and may be locked in any desired position by a lock nut 22. The rod 21 at its front portion is formed with a series of longitudinal grooves 23 around it between which, near the front end of the rod, are outwardly extending radial ribs or wings 24, the front portions of which are cut downwardly and outwardly at an angle, as indicated at 25. The extreme front portion of the rod 21 is provided with a head or sizing die 26, the purpose of which will later appear.

Located over the rod 21 is a die or saw setting member 27 the front end portion of which is milled to make a plurality of radial slots 28 into which the radially extending wings 24 on the rod 21 extends. The metal between the slots 28 of member 27 at the outer end of said member 27 is cut away to provide inclined surfaces 29 which cross the first described inclined surfaces 25 on the wings 24. The members 21 and 27 together form a saw setting die to act on a cylindrical saw to set its alternate teeth inwardly and outwardly respectively. With the two dies mounted as described, their relative longitudinal positions may be adjusted by screwing the inner member 21 in or out in the holder 18 and the outer member 27 will slide in the inner member and abut against the face of the holder 18. Thus an accurate relative adjustment of the inner and outer saw setting surfaces 25 and 29 may be obtained.

The saw 30 which is to be set is formed of sheet metal into cylindrical form and at one end is provided with a consecutive series of saw teeth 31. The opposite end of the cylindrical saw is secured in an arbor 32 which has an enlargement 33 of a size to properly fit and bear against the pins or rods 6 and hold the saw properly aligned with the saw setting members 21 and 27.

With the saw and its arbor in the position shown in Fig. 1, the handle 17 may be operated to force the plunger 8 rearwardly, whereupon its head 9 comes against the outer end of the arbor and forces the saw teeth 31 against the saw setting surfaces or inclines 25 and 29. Alternate teeth 31 of the saw are bent inwardly by reason of their engagement with the setting surfaces 29, as shown in Fig. 4, while the other teeth engage against the saw setting surfaces 25 and are bent outwardly, as shown in Fig. 6. The inwardly bent teeth may be partly received in the grooves 23 when the setting operation takes place.

Turning the handle 17 back to its original position releases the plunger 8 which, under the influence of the spring 11, returns to its original position, shown in Fig. 1. This releases the saw and arbor for removal from the machine after bending certain of the teeth inwardly so that they are partly received in the grooves 23 back of the sizing die 26. Removal of the saw should be outward in a direction parallel to its axis so that when the inwardly bent teeth of the saw pass over the die 26 they will be partly rebent in an outward direction and the extent of rebending uniform with respect to all such teeth as engage with the die 26.

To accomplish this a post 34 having a threaded stem 35 at its rear end is connected to the post 2 at the upper end thereof, the axis of said post 34 being parallel to the axis of the plunger 8 and to the length of the pins 6. A lever 36 is pivotally mounted at the front end of the post 34, its lower end being back of the enlargement 33 on the arbor and normally held in such position by a tension spring 37. Grasping the handle 36 at its upper end and moving it toward the rear brings the lower end of the lever against such enlargement 33 and the arbor with the attached saw is moved forwardly and guided over the supporting pins 6 so that the saw is properly withdrawn over the die 26.

The machine described is secured at one edge of a horizontal table 38 or other equivalent support in practice. The saws with their attached arbors are taken from the button blank cutting machine placed in the machine and with one operation of the lever 17 the saw is perfectly set. The set, of course, occurs usually after the teeth have been properly filed. The machine is very practical and efficient and has so proved in service. Variations in the detail of the structure of the machine may be resorted to without departing from the invention which is defined in the appended claims and which is to be considered comprehensive of all forms of structure coming within the scope thereof.

I claim:

1. A saw setting machine comprising, a saw setting die adapted to set the teeth of a cylindrical saw, an arbor therefor, a slide in alignment with the axis of the saw setting die and adapted to support the arbor of a cylindrical saw in proper operative position, a slidable plunger in alignment with said slide and engageable with said arbor and a means for actuating said plunger to force the saw into engagement with the saw setting die.

2. A saw setting die adapted to set alternate teeth of a cylindrical saw inwardly and outwardly respectively and a sizing die extending beyond the saw setting die and adapted to enter the cylindrical saw beyond the teeth thereof whereby the inwardly set teeth of the saw will engage the sizing die upon removal of the saw from the die to accurately position the inwardly set teeth.

3. A saw setting machine comprising a saw setting die adapted to set alternate teeth of a cylindircal saw inwardly and outwardly respectively, a sizing die extending forwardly from the saw setting die and adapted to enter the cylindrical saw beyond the teeth thereof as and for the purpose described means for detachably supporting the dies, means for forcing a saw into an operative engagement with the saw setting die and means for removing the saw from the die.

4. A saw setting machine comprising a saw setting die adapted to set the teeth of a cylindrical saw, having an arbor therefor, means for detachably and slidably supporting the arbor of a cylindrical saw in alignment with said saw setting die, a slidable plunger in alignment with said supporting means, and engageable with said saw arbor, a pivoted lever engageable at one end with said plunger to move the same, and a manually rotatable cam in engagement with the opposite end of said lever.

5. A saw setting machine comprising a saw setting die adapted to set alternate teeth of a cylindrical saw inwardly and outwardly respectively, an arbor therefor, a sizing die extending forwardly from the saw setting die and adapted to enter the cylindrical saw beyond the teeth thereof as and for the purpose described, means for rotatably supporting the arbor of a cylindrical saw in alignment with said dies, a plunger slidable in alignment with said supporting means and engageable with said saw arbor, a pivoted lever engageable at one end with said plunger to slide the same, a manually rotatable cam in engagement with the opposite end of said lever, and a manually operable removing lever engageable with said arbor to remove the saw from the dies.

6. A saw setting die comprising a holder, an inner die having outwardly inclined saw setting surfaces and mounted for longitudinal adjustment in said holder, and an outer die having inwardly inclined saw setting surfaces surrounding said inner die and longitudinally movable thereon and seating against said holder.

In testimony whereof I affix my signature.

WARREN E. KNOTT.